United States Patent
Biswal et al.

(10) Patent No.: US 9,361,053 B2
(45) Date of Patent: Jun. 7, 2016

(54) CONFIDENTIAL-SENDER EMAIL ADDRESSES FOR PRINTING

(71) Applicant: Hewlett-Packard Development Company, L.P., Houston, TX (US)

(72) Inventors: Bibhu Prasad Biswal, Bangalore (IN); Sibin Jos Koothur, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/754,999

(22) Filed: Jan. 31, 2013

(65) Prior Publication Data

US 2014/0211233 A1 Jul. 31, 2014

(51) Int. Cl.
G06K 15/00 (2006.01)
G06F 3/12 (2006.01)

(52) U.S. Cl.
CPC ............ *G06F 3/1238* (2013.01); *G06F 3/1222* (2013.01); *G06F 3/1267* (2013.01); *G06F 3/1287* (2013.01); *G06F 3/1288* (2013.01)

(58) Field of Classification Search
None
See application file for complete search history.

(56) References Cited

U.S. PATENT DOCUMENTS

| | | |
|---|---|---|
| 6,751,732 B2 | 6/2004 | Strobel et al. |
| 6,922,258 B2 | 7/2005 | Pineau |
| 7,385,721 B2 | 6/2008 | Shahindoust |
| 7,526,555 B2 | 4/2009 | Shahindoust |
| 7,701,602 B2 | 4/2010 | Burke et al. |
| 7,747,699 B2 | 6/2010 | Prueitt et al. |
| 7,982,890 B2 | 7/2011 | Corlett et al. |
| 8,009,311 B2 | 8/2011 | Takahashi |
| 8,169,633 B2 | 5/2012 | Aikens et al. |
| 8,610,921 B2 | 12/2013 | Miyake |
| 2001/0017712 A1* | 8/2001 | Kasatani ................. 358/1.15 |
| 2002/0042884 A1 | 4/2002 | Wu et al. |
| 2003/0115250 A1 | 6/2003 | Bernier et al. |
| 2003/0187951 A1* | 10/2003 | Shen ........................ 709/219 |
| 2004/0137928 A1 | 7/2004 | Biundo |
| 2004/0146327 A1 | 7/2004 | Hata et al. |
| 2005/0057766 A1 | 3/2005 | Delaplace et al. |
| 2006/0018445 A1* | 1/2006 | Mittal ..................... 379/88.17 |
| 2006/0149970 A1 | 7/2006 | Imazu |
| 2006/0181730 A1 | 8/2006 | Moore |
| 2007/0050871 A1 | 3/2007 | Mashhour |
| 2008/0062454 A1* | 3/2008 | Bostick ................ G06F 21/608 358/1.15 |

(Continued)

FOREIGN PATENT DOCUMENTS

JP 2002297510 A 10/2002
WO WO-2013/095498 A1 6/2013

OTHER PUBLICATIONS

Xiao, H. et al.; "Hierarchical Trustworthy Authentication for Pervasive Computing"; Aug. 6-10, 2007; 3 pages.

(Continued)

*Primary Examiner* — John Wallace
(74) *Attorney, Agent, or Firm* — Mannava & Kang, P.C.

(57) ABSTRACT

In one example, an email address of a network-connected printer is stored. A print authorization code is stored. A confidential-sender email address is received and stored. After the receiving and storing of the confidential-sender email address, an email is received. The email is an email sent to the printer address, and includes a print job. Responsive to determining the email was sent from the confidential-sender address, the print job is stored. Responsive to receiving the print-authorization code, the print job is sent to the printer for printing.

18 Claims, 6 Drawing Sheets

(56) References Cited

U.S. PATENT DOCUMENTS

| | | | |
|---|---|---|---|
| 2008/0263156 A1* | 10/2008 | Costea et al. | 709/206 |
| 2008/0320296 A1 | 12/2008 | Walker et al. | |
| 2009/0021776 A1 | 1/2009 | Dolan et al. | |
| 2009/0064346 A1 | 3/2009 | Larsson et al. | |
| 2009/0086246 A1* | 4/2009 | Asai | 358/1.13 |
| 2009/0185223 A1 | 7/2009 | Kanai et al. | |
| 2009/0244595 A1 | 10/2009 | Kim et al. | |
| 2010/0027054 A1 | 2/2010 | Reddy et al. | |
| 2010/0195144 A1 | 8/2010 | Kawai | |
| 2010/0245033 A1 | 9/2010 | Sasakuma | |
| 2010/0265531 A1 | 10/2010 | Nitta | |
| 2011/0063648 A1 | 3/2011 | Moore | |
| 2011/0255112 A1 | 10/2011 | Martin et al. | |
| 2012/0246741 A1* | 9/2012 | Klotz et al. | 726/28 |
| 2012/0262753 A1 | 10/2012 | Viccari et al. | |
| 2013/0222827 A1* | 8/2013 | Watanabe | 358/1.13 |

OTHER PUBLICATIONS

"Securing Network Print Jobs," White Paper—Levi, Ray & Shoup, Inc., 2002, pp. 1-9, Available at: <lrs.com/eom/PDF/wp-White-Paper/wp-Securing-Network-english.pdf>.

RemoteDocs—Electronic Document Delivery, 2003, pp. 1-3, Data-Vision, Inc., Available at: <remotedocs.com/faqs.htm>.

"Building a Platform to Bridge Low End Mobile Phones and Cloud Computing Services", Tso, F.P. et al., Mar. 2011, pp. 22-26, vol. 9, Issue 1, <http://wwwen.zte.com.cn/endata/magazine/ztecommunications/2011Year/no1/201103/P020110318511856092974.pdf>.

"IVR Ticketing, Interactive Voice Response (IVR) based Payment and Ticketing", Jet Airways, downloaded date Nov. 9, 2011, 2 pages, < http://www.jetairways.com/IT/IT/PlanYourTravel/IVRTicketing.aspx>.

Get Started Now—Personal Printing in Use; ThinPrint—Cortado's Printing Technology; http://www.thinprint.com/Products/Overview/PersonalPrinting/Getstarted.aspx, Jan. 8, 2013, 2 pages.

Hewlett-Packard Development Company, L.P, "HP Universal Print Driver," Solution and Feature Guide, 2009, 24 pages, <http://h20331.www2.hp.com/Hpsub/downloads/UPD5_guide_final,%20web.pdf>.

Hewlett-Packard Development Company, L.P., "HP ePrint Enterprise mobile printing solution," Jul. 2012, 2 pages, <http://www.hp.com/hpinfo/newsroom/press_kits/2012/FallBizPrinting/HP_ePrint_Enterprise_Solution_Brief.pdf>.

Hewlett-Packard Development Company, L.P., "HP Universal Print Driver," May 2011, 8 pages, <http://h20331.www2.hp.com/Hpsub/downloads/UPD%205%203%20brief.pdf>.

PrinterOn Corporation, "How Does it Work?," Mobile Printing Solutions for Hotels, Libraries, Airports, Cafes; available Mar. 11, 2012, 1 page, <http://web.archive.org/web/20120311164705/http://www.printeron.com/solutions/cloudsolutions/public/how-does-it-work.html>.

Ricoh Americas Corporation, "Ricoh Aficio Common Security Features Guide," 2009, 27 pages, <http://web.archive.org/web/20130123202855/http://www.oit.uci.edu/security/RicohCommonSecurityFeaturesGuide.pdf>.

Ricoh, "Print Cloud," User's Guide, 2011, 63 pages, <http://www.ricoh-cloud.com/files/PrintCloud_UserGuide_1.7.pdf>.

International Preliminary Report on Patentability received in PCT Application No. PCT/US2011/066792, mailed Jun. 24, 2014, 7 pages.

Hewlett-Packard Development Company, L.P., "Cloud printing in the enterprise: Liberating the mobile print experience from cables, operating systems and physical boundaries," Mar. 2010, <http://www.hubtechnical.com/Collateral/Documents/English-US/HP/11-CloudPrintingintheEnterprise.pdf>.

Hewlett-Packard Development Company, L.P., "HP Access Control Secure Pull Printing," Nov. 2008, <http://h71028.www7.hp.com/enterprise/downloads/HP-Access-Control-Secure-Pull-Printing.pdf>.

Hewlett-Packard Development Company, L.P., "HP ePrint Enterprise mobile printing solution," Mar. 2010, <http://www.hp.com/hpinfo/newsroom/press_kits/2010/MPSSpring2010/pdf/HP_ePrint.pdf>.

Hewlett-Packard Development Company, L.P., "HP ePrint Enterprise mobile printing solution," Sep. 2010, <http://www.hp.com/hpinfo/newsroom/press_kits/2010/InnovationSummit/HP_ePrint_Enterprise_Solution.pdf>.

* cited by examiner

CONFIDENTIAL-SENDER EMAIL ADDRESSES FOR PRINTING

BACKGROUND

Certain printers are capable of receiving communications and printable content via the internet without being connected to a desktop computer, notebook computer, or other host computing device. An advantage of such a printer print jobs can be received for printing from other computing devices located anywhere around the globe.

BRIEF DESCRIPTION OF THE DRAWINGS

The accompanying drawings illustrate various examples and are a part of the specification. The illustrated examples do not limit the scope of the claims. Throughout the drawings, identical reference numbers designate similar, but not necessarily identical elements.

The same part numbers designate the same or similar parts throughout the figures.

DETAILED DESCRIPTION OF EXAMPLES

Figure 1:
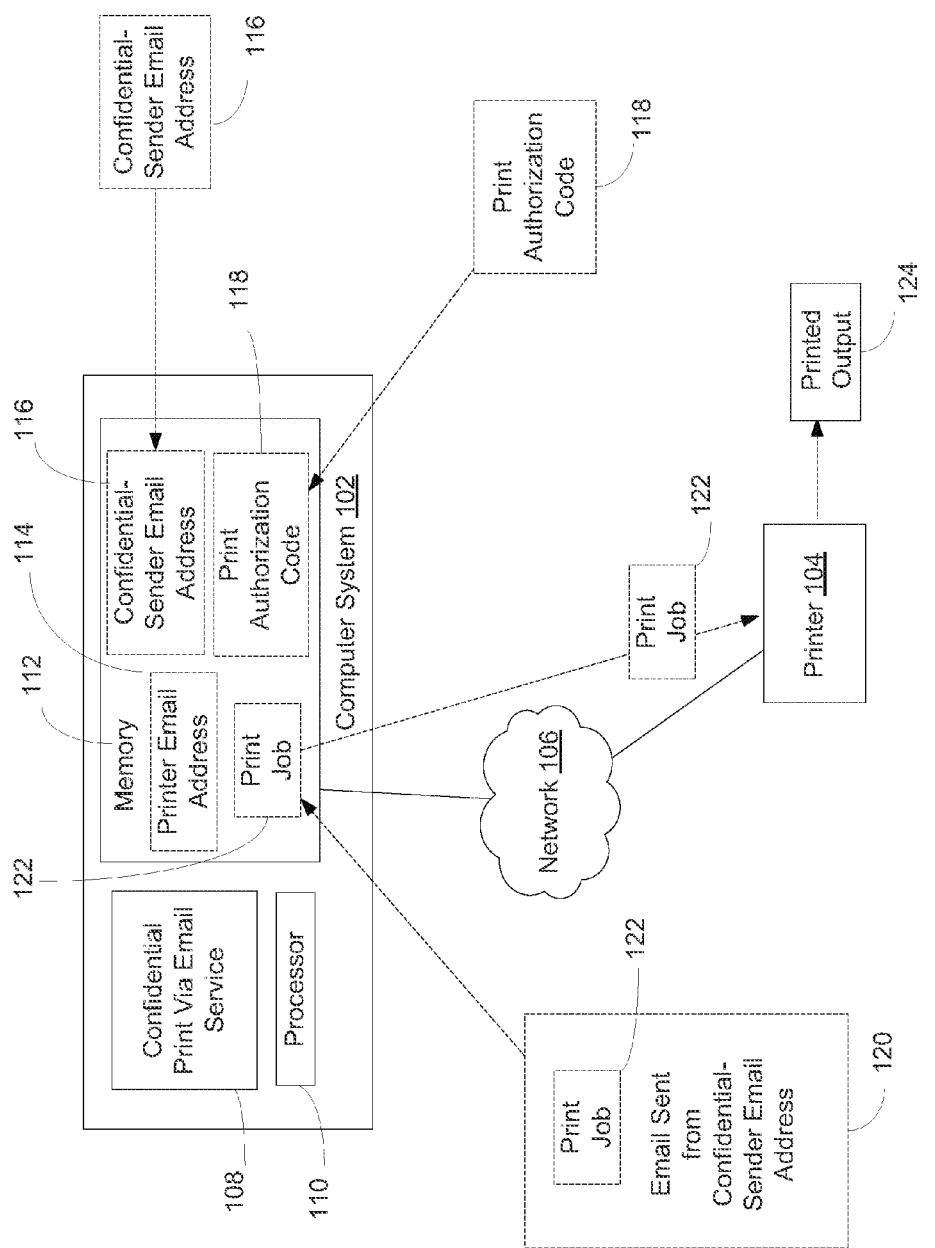
FIG. 1 is a block diagram illustrating a system according to various examples.

In an example of a conventional web-connected printer system, a job-sending computing device sends an email that includes the print job to a cloud-based internet print service. The print service receives the email, and in turn sends the print job to the destination printer for printing.

However, with conventional web-connected printer systems, using emails to send print jobs containing confidential data can be an area of concern. Upon receipt of the email that includes a print job for a destination printer, the conventional email print service automatically forwards the print job to the printer for printing. As forwarding of the job to the printer occurs without a consideration of the possible confidential nature of the print job, the confidential print job may be printed at time the intended recipient is not present. This can result in the printed output being accessible to anyone in the printer vicinity. Thus, users may be hesitant to utilize a conventional web-connected printer system in connection with tasks such as receiving bills or monthly bank statements.

Accordingly, various examples described herein were developed to provide a confidential print-via-email service that controls access to confidential jobs sent via email to a print service. Examples of the disclosure will provide a secure method and system for transmitting a print job via a printer email address, and printing the job at a web-enabled printer. In an example, a confidential print-via-email service executing at a cloud server system receives emails that include print jobs, and filters the print jobs according to a directory or database of confidential-sender email addresses. The confidential print-via-email service causes a print job that was sent to the printer email address from a confidential-sender email address to be stored until the intended recipient user presents a print authorization code. Upon receipt of the expected print authorization code, the confidential print-via-email service sends the stored print job to the printer for printing.

Advantages of the disclosure are numerous. First, users will appreciate the resulting secure print-via-email capabilities of the web-connected printer, and will be more likely to explore and utilize print-via-email functionality for the user's printing relating to finances, health care, education, and other sensitive and confidential materials. User satisfaction with network-connected printers, cloud printing, and print-via-email services will increase. Another significant advantage of the disclosure is that, in examples, the disclosed method and system can be applied to a web-connected printer that is used by multiple users. In an example of the disclosure, each user can configure a personal list of confidential-sender email addresses. In this example, each user can then access his or her print jobs, at a time the user is present at the printer to retrieve the printed output, by sending a triggering authentication code to the confidential print-via-email service.

It should be noted that while the disclosure is discussed frequently with reference to internet-connected printers, the teachings of the present disclosure are not so limited and can be applied to any network-connected printer. As used herein, a "network-connected printer" refers to a printer that is connected to a network, to be capable of obtaining content, sending and receiving messages, accessing network content, and/or accessing applications via a network. In examples, the network may be a proprietary network, a secured network, an open network, an intranet, an extranet, an internet or the Internet. As used in this application, a "printer" or "printing device" refers to any liquid inkjet printer, solid toner-based printer, liquid toner-based printer, or any other electronic device that prints. "Printer" or "printing device" includes any multifunctional electronic device that performs a function such as scanning and/or copying in addition to printing.

An "email" refers to a message sent electronically from one email address to another email address. An "email address" refers to a character string, text, image, graphic, or other element that identifies an address from which electronic messages may be sent, to which electronic messages may be delivered. A "period" refers to an interval of time, length of time, or measured passage of time. A "print job" or "job" refers to content and/or instructions as to formatting and presentation of the content sent to a computer system for printing. A print job may be stored in a programming language and/or numerical form so that it can stored and used in computing devices, servers, printers and other machines capable of performing calculations and manipulating data. An "authorization code" refers to any text, number, PIN, password, character string, image, graphic, biometric data, or other element that is to be provided in some manner, e.g., by a user or a system, to initiate an event or get the use of something, including, but not limited to, to retrieving and/or printing a print job. An "account" refers to a record or an identification credential associated with a user. Examples include, but are not limited to a user identification ("user ID"), an email account, an email address, a financial account, or any other personal identifier.

A "web application" refers to a computer software application or web page that is coded in a browser-supported language (such as XML, HTML, or HTML with JavaScript) and is reliant on a web browser application to render the application executable (or in the case of a web page, presentable). Examples of web applications are web pages, webmail, online search engines, online sale and auction sites, and wikis. A "printer application" refers to a web application or other software application that is accessible to a user at a network-connected printer and that enables retrieval of content from computing devices external to the printer.

FIG. 1 shows a computer system 102 and a printer 104, electronically connected to each other via a network 106.

Computer system 102 represents generally any computing device or group of computing devices configured to send and receive network requests, send and receive data, and/or otherwise communicate with the network-connected printer 104. In an example, the computer system 102 may be a server, desktop computer, notebook computer, tablet computer, smartphone, or any other computing device.

Network connected printer 104 represents generally any computing device or group of computing devices operable to produce a printed print job or printed content, and additionally operable to send and receive internet requests, receive printable content and print jobs, and otherwise communicate, via the network 106, with, the computer system 102.

Network 106 represents generally hardware components and computers interconnected by communications channels that allow sharing of resources and information. Network 106 may include a cable, wireless, fiber optic, or remote connection via a telecommunication link, an infrared link, a radio frequency link, or some combination of these, or any other connectors or systems that provide electronic communication. Network 106 may include, at least in part, an intranet, the internet, or a combination of both. Network 106 may also include intermediate proxies, routers, switches, load balancers, and the like. The paths followed by network 106 between the computer system 102 and the printer 104 as depicted in FIG. 1 represent the logical communication paths between these devices, not necessarily the physical paths between the devices.

Computer system 102 is shown to include a confidential print-via-email service 108, a processor 110, and a memory 112. The confidential print-via-email service (also referred to herein as "CPVES") 108 represents generally any combination of hardware and programming configured to provide an efficient and secure method and system for sending confidential print jobs to a web-enabled printer via a printer email address, and printing such confidential jobs at the printer.

In the example of FIG. 1, the CPVES 108 executing at the computer system 102 stores a printer email address 114 that is specific to printer 104. In an example, the stored email address is in the form of a character string such as "myprinter@hpeprint.com", and is an address to which an email can be sent to cause a print job included within the email to be printed at printer 104.

Continuing with the example of FIG. 1, the CPVES 108 receives and stores a print authorization code 118. In examples, the authorization code 118 may be or include, text, a number, PIN, password, character string, image, graphic, biometric data, or any other electronically communicable element that can be provided by a user to confirm the user's authorization to request, retrieve, or print a print job. In an example, the CPVES 108 stores the print authorization code 118 in memory 112 during a setup period so that it is available for comparison or verification purposes when the print authorization code 118 is again received at CPVES 108 during a print request and printing period.

Continuing with the example of FIG. 1, during a set-up period during which a user is setting up the confidential print via email feature for use with printer 104, the CPVES 108 receives and stores a confidential-sender email address 116. The confidential-sender email address 116 is an address that a user has sent to the CPVES 108 to identify a sender of confidential print jobs. In an example, a user, via interaction with a user interface at printer 104 or a user interface at a computing device other than printer 104, causes the sending of the confidential send email address 116 to the computer system 102, to be received by the CPVES 108. In an example, a user may send to the CPVES 108 multiple confidential-sender email addresses, e.g., a confidential email address for the user's bank and a confidential email address for the user's health care provider, thereby instructing the CPVES 108 that print jobs received from the bank's email address or the health care provider's email address will require user provision of a valid print authorization code to the CPVES 108 before such jobs will sent to and printed at printer 104.

During a print request and printing period, a period occurring after the setup period during which the confidential sender email address was received and stored, the CPVES 108 receives an email 120 that was sent to the printer email address 114 and includes a print job 122. In an example, the email 120 may include the print job 122 as an attached document or other attached file. In another example, the print job 122 may be or include text of the email body or header. Also during the print request and printing period, the CPVES 108 makes a determination that the email 120 was sent from the confidential-sender address 116. Responsive to such determination, the CPVES 108 stores the print job 122 in memory 112. The CPVES 108 causes the print job 122 to be held in memory 112 until such time as the CPVES 108 receives the print authorization code 118 during the print period. In an example, the print authorization code 118 is sent to the CPVES 108 as a result of user interaction with a user interface at the printer 104. In another example, the print authorization code 118 is sent to the CPVES 108 as a result of user interaction with a smartphone, tablet computer, or other device that is a distinct computing device relative to printer 104. Responsive to receiving the print authorization code 118, the CPVES sends the stored print job 122 to the printer 104 for printing upon a media to create printed output 124.

In examples, the CPVES 108 may receive the confidential sender email address 116, the email 120 that includes a print job and is received from a confidential-sender email address, and the print authorization code 118, and the CPVES 108 may send the print job 122 to the printer 104, over the network 106 via a networking protocol, including but not limited to Transmission Control Protocol/Internet Protocol ("TCP/IP"), HyperText Transfer Protocol ("HTTP"), and/or Session Initiation Protocol ("SIP").

The functions and operations described with respect to the CPVES 108 and the computer system 102 may be implemented as a non-transitory computer-readable storage medium containing instructions executed by a processor (e.g., processor 110) and stored in a memory (e.g., memory 112). In a given implementation, processor 110 may represent multiple processors, and memory 112 may represent multiple memories. Processor 110 represents generally any instruction execution system, such as a computer/processor based system or an ASIC (Application Specific Integrated Circuit), a computer, or other system that can fetch or obtain instructions or logic stored in memory 112 and execute the instructions or logic contained therein. Memory 112 represents generally any memory configured to store program instructions and other data.

Figure 2:
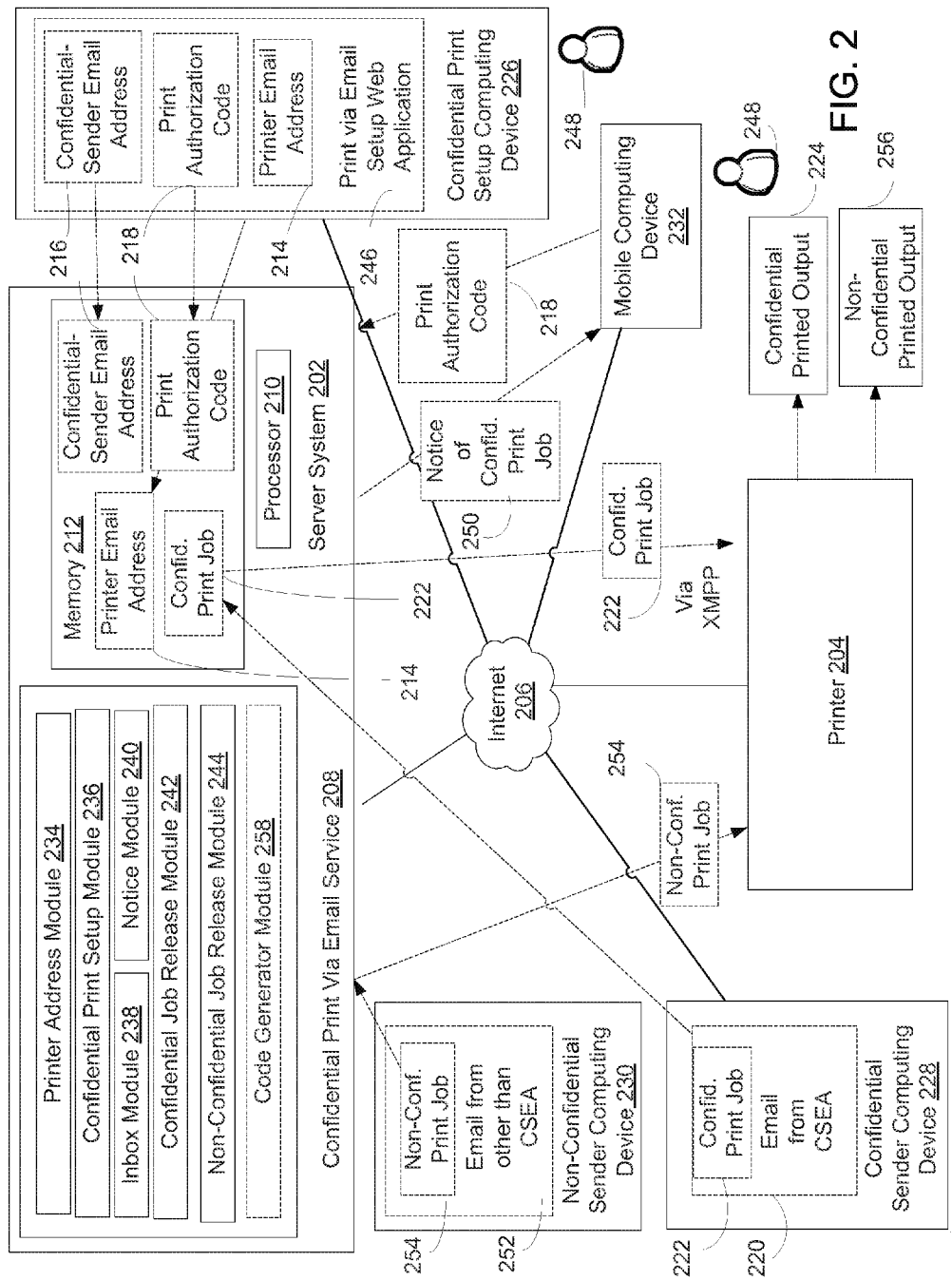
FIG. 2 is a block diagram illustrating a system according to various examples.

FIG. 2 is a block diagram illustrating a system according to various examples. FIG. 2 includes particular components, modules, etc. according to various examples. However, in different examples, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 2 shows a server system 202, a confidential print setup computing device 226, a confidential-sender computing device 228, a non-confidential sender computing device 230, a mobile computing device 232, and a printer 204, each electronically connected to each other via an internet 206.

Server system 202 represents generally any computing device or group of computing devices configured to send and receive network requests, send and receive data, and/or otherwise communicate with printer 204. The sending and receiving of network requests and data, and communications includes, but is not limited to, network requests, data, and communications associated with receiving print jobs, including receiving print jobs via email, for printing at printer 204, and sending confidential and non-confidential print jobs to print jobs to printer 204. In an example, the server system 202 may be a server, desktop computer, notebook computer, tablet computer, smartphone, or any other computing device.

Confidential print setup computing device 226 represents generally any computing device or group of computing devices configured to send and receive network requests, send and receive data, and/or otherwise communicate with the server system 202. The sending and receiving of network requests and data, and communications includes, but is not limited to, network requests, data, and communications associated with setting up of printer 204 to communicate and interact, via the internet 206, with the confidential print-via-email service 208 executing at the server system 202. In an example, the printer-setup computing device 232 may be a server, desktop computer, notebook computer, tablet computer, smartphone, or any other computing device.

Confidential-sender computing device 228 and non-confidential-sender computing device 230 each represent generally any computing device or group of computing devices configured to send and receive network requests, send and receive data, and/or otherwise communicate with the server system 202. The sending and receiving of network requests and data, and communications includes, but is not limited to, network requests, data, and communications associated with sending emails that includes print jobs to server system 202. In an example, the confidential-sender computing device 228 and the non-confidential-sender computing device 230 may each or both be a server, desktop computer, notebook computer, tablet computer, smartphone, or any other computing device.

Mobile computing device 232 represents generally any computing device or group of computing devices configured to send and receive network requests, send and receive data, and/or otherwise communicate with the server system 202. The sending and receiving of network requests and data, and communications includes, but is not limited to, network requests, data, and communications associated with receiving notice of a print job available for printing at printer 204, and the sending of a print authorization code to trigger the printing of such job. In examples, the mobile computing device 232 may be a notebook computer, tablet computer, smartphone, or any other mobile computing device, or any non-mobile computing device.

Internet-connected printer 204 represents generally any computing device or group of computing devices operable to produce a printed print job or printed content, and additionally operable to send and receive internet requests, receive printable content and print jobs, and otherwise communicate, via the internet 206, with the server system 202.

Internet 206 represents generally hardware components and computers interconnected by communications channels that allow sharing of resources and information. Internet 206 may include a cable, wireless, fiber optic, or remote connection via a telecommunication link, an infrared link, a radio frequency link, or some combination of these, or any other connectors or systems that provide electronic communication. Internet 206 may be or include, at least in part, an intranet, the Internet, or a combination of both. Internet 206 may also include intermediate proxies, routers, switches, load balancers, and the like. The paths followed by internet 206 between the server system 202, the confidential print setup computing device 226, the confidential-sender computing device 228, the non-confidential sender computing device 230, the mobile computing device 232, and the printer 204 as depicted in FIG. 2 represent the logical communication paths between these devices, not necessarily the physical paths between the devices.

Server system 202 is shown to include a confidential print-via-email service 208, a processor 210, and a memory 212. The confidential print-via-email service 208 (also referred to herein as "CPVES") 208 includes a printer address module 234, a confidential print setup module 236, an inbox module 238, a notice module 240, a confidential job release module 242, a non-confidential job release module 244, and a code generator module 258. Processor 210 represents generally any instruction execution system, such as a computer/processor based system or an ASIC (Application Specific Integrated Circuit), a computer, or other system that can fetch or obtain instructions or logic stored in memory 212 and execute the instructions or logic contained therein. Memory 212 represents generally any memory configured to store program instructions and other data.

In the example of FIG. 2, the printer address module 234 executing at the server system 202 receives from the confidential print setup computing device 226 a printer email address 214 that is unique to printer 204. In an example, the stored email address is in the form of an alphanumeric string such as "123456789@hpeprint.com", and is an address to which a user or system may send an email with a print job, to cause printing of the print job at printer 204. In an example, the printer email address 214 may be received during a set-up period during which a user interacting with confidential print setup computing device 226 is setting up the confidential print via email feature for use in connection with emails that include or carry print jobs to be printed at printer 204. In this example, the printer email address 214 is received at the server system 202 via a web application 246 that is accessed by a user at the confidential print setup computing device 226. In an example, the web application 246 is a web application hosted by the server system 202, the application for setting up a printing-via-email feature for the printer 204. In another example, the web application 246 is a web application hosted by a computer system other than the server system 202. In yet another example, the printer email address 214 may be received at a time other than a printer or printing-via-email feature set-up period, e.g., during a batch load of printer email addresses to the CPVES 208 according to an enterprise administrative user's instruction.

Continuing with the example of FIG. 2, during the set-up period during which a user 248 at confidential print setup computing device 226 is setting up a confidential print via email feature to work with printer 204 (the "setup period"), the confidential print setup module 236 receives and stores a confidential-sender email address 216. The confidential-sender email address 216 is an address that a user 248 has caused the confidential print setup computing device 226 to send to the CPVES 208 at server system 202. The confidential-sender email address 216 is an email address from which the user 248 expects to receive confidential print jobs at printer 204. In an example, by submitting the confidential-sender email address 216 to the server system 202, the user has instructed the confidential print via email service 208 to recognize as confidential any print job that may be attached to or otherwise included with emails sent from the confidential sender email address 216. (In FIG. 2, the confidential sending address is sometimes referred to as the "CSEA".) In an example, a user 248 may send to the server system 202 a confidential-sender email address for the user's bank, thereby instructing the CPVES 208 that print jobs received via an email received from the bank's email address are to be held in memory 212 at server 202 pending user provision of a valid print authorization code to the CPVES 208. After the CPVES 208 receives the valid print authorization code 218 during a print request and printing period (a period occurring after the setup period in which the confidential-sender email address 216 was received) the CPVES 2208 will send the bank print job to the printer 204 for printing.

In the example of FIG. 2, during the set-up period the confidential print setup module 236 receives and stores a print authorization code 218. In examples, the authorization code 218 may be or include, text, a number, PIN, password, character string, image, graphic, biometric data, or any other electronically communicable element that can be provided by a user to confirm the user's authorization to request, retrieve, or print a print job. In an example, the confidential print setup module 236 receives the code 218 from the confidential print setup computing device 226 as a result of a user 248 having provided the code 218 at the setup computing device 226 and the device 226 having sent the code 218, via the internet 206, to the CPVES 208 at server system 202. In an example, the user 248 at the setup computing device 226 provides the code by tendering (including but not limited to swiping or waving) a card, badge or other code-bearing media at the setup computing device 226. In another example, the user 248 at the setup computing device 226 provides the code by providing biometric data such as a fingerprint, thumbprint, retina image, etc. at the device 226. In yet another example, not illustrated at FIG. 2, during the setup period the confidential print setup module 236 receives the print authorization code 218 from the printer 204 as the result of a user having provided the code 218 at the printer 204, and the printer having sent the code 218 to the CPVES 208 for storage in memory 212. The confidential print setup module 236 stores the print authorization code 218 in memory 212 during the setup period so that it is available for comparison or verification purposes when the print authorization code is again received at CPVES 208 during a print request and printing period.

It should be noted that, in some other examples the print authorization code 218 that is stored at the server system 202 during the setup period, or at some other time prior to the print request and printing period, is not necessarily a code received at the CPES 208 after having been created by a user or other computing device. FIG. 2 illustrates a code generator module 258 that is configured to generate a print authorization code and send the code to a network connected computing device. In one example of code generation at the CVPES 208, the CPVES sends the generated code 218 to a network connected device, e.g., a smartphone. In an example the generated code is stored at the smartphone, and then at a print request and printing period a user could cause the smartphone, or cause the printer, to send the code 218 to the CPVES 208 so as to initiate the sending of a confidential print job, stored in memory 212, to the printer 204 for printing.

During a print request and printing period occurring after the confidential print setup module has received and stored the confidential-sender email address 216, the inbox module 238 receives an email 220 that includes a print job 222 and that was sent to the printer email address 214. In this example, the email 220 was sent from the confidential-sender email address 216 that had been identified during the setup period as a provider of confidential print jobs. In this example, the email 220 was sent as a result of user interaction with, or a system instruction at, the confidential sender computing device 228. Also during the print request and printing period, the confidential print setup module 236 makes a determination that the email 220 was sent from the confidential-sender address 216. In an example, the confidential print setup module compares the sender address of the email 220 to a list of confidential-sender email addresses held in memory 212, and finds that the sender address of email 220 is the same as or matches the confidential sender email address 216 held in memory 212. Responsive to determining that the email 220 was sent from the confidential-sender address 216, the inbox module 238 stores the print job 222 that is included in the email 222 in memory 212. In an example, the inbox module 238 causes the print job 222 to be stored until such time as a valid print authorization code 218 is received at the confidential print via email service.

In the example of FIG. 2, notice module 240 next sends, via the internet 206, to the mobile computing device 232 a notice 250 that the print job 222 is stored at a cloud print server system and is available for printing at the printer 204 following a user input of the print authorization code 218. In another example, the notice module 240 may additionally send a similar job-available notice 250 to the printer 204. In another example, the notice module 240 may send such notice to the printer 204 instead of the mobile computing device 232. In yet another example, the notice module 240 may send such notice to the printer 204, the mobile computing device 232, and a set of other notice recipient computing devices identified by a user during the confidential print-via-email setup period.

Continuing with the example of FIG. 2, during the print request and printing period that follows the receipt of the confidential sender email address 216 at the server system 202, a user 248 at the mobile computing device 232 causes the mobile computing device 232 to send the print authorization code 218 to the server system 202. As was the case for the first sending of the print authorization code to the server system 202 during the set-up period, the user-provided authorization code 218 may be or include, text, a number, PIN, password, character string, image, graphic, biometric data, or any other electronically communicable element that can be provided by a user to confirm the user's authorization to request, retrieve, or print a print job. In this example, the mobile computing device 232 sends the print authorization code 218 to the server system 202 as a result of the user 248 having provided the code 218 at the device 232 and the device having sent the code 218, via the internet 206, to the CPVES 208 at server system 202. In an example, the user 248 at the mobile computing device 226 may provide the code by tendering (including but not limited to swiping or waving) a card, badge or other code-bearing media at the setup computing device 226. In another example, the user 248 at the mobile computing device 232 may provide the code 218 by providing biometric data such as a fingerprint, thumbprint, retina image, etc. at the mobile device 232.

The confidential job release module 242, during the print request and printing period, receives the print authorization code 218 from the mobile computing device 232 via the internet 206. Responsive to receiving the print authorization code 218, the confidential job release module 242 sends the stored print job 222 to the printer 204 for printing. The printer 204 prints the confidential print job 222 upon a media to create the printed output 224. In this example as the user 248 sent the print authorization code 218 from the mobile computing device to the server system 202, the user 248 knows the job is being printed at printer 204 and user 248 will be present at the printer 204 to retrieve the printed output 224, or will send a trusted other user to retrieve the printed output 224 at the printer 204.

In the example of FIG. 2, during the print request and printing period the inbox module 238 receives, from the non-confidential sender computing device 230, a second email 252. Upon receipt of the second email 252, the confidential print setup module 236 makes a determination that the second email 252 was sent from an address other than the confidential-sender address 216. In an example, the confidential print setup module compares the sender address of the second email 252 to a list of confidential-sender email addresses held in memory 212, and finds that the sender address of second email 252 is not the same as or does not match the confidential-sender email address 216 held in memory 212 or any of the other confidential sender email address held in memory 212. In this example, responsive to determining that the second email 252 was not sent from the confidential-sender address 216, the non-confidential job release module 244 causes the nonconfidential print job 254 included within the second email 252 to the printer 204 for printing without a requirement of a received code print authorization code. As the print job 254 included within the second email has been determined to be from other than a known confidential-sender email address (e.g., confidential-sender email address 216), it is sent to the printer 204 without any condition precedent of receiving a print authorization code from a user.

The functions and operations described with respect to the CPVES 208 and the server system 202 may be implemented as a non-transitory computer-readable storage medium containing instructions executed by a processor (e.g., processor 210) and stored in a memory (e.g., memory 212). In a given implementation, processor 210 may represent multiple processors, and memory 212 may represent multiple memories. Processor 210 represents generally any instruction execution system, such as a computer/processor based system or an ASIC (Application Specific Integrated Circuit), a computer, or other system that can fetch or obtain instructions or logic stored in memory 212 and execute the instructions or logic contained therein. Memory 212 represents generally any memory configured to store program instructions and other data.

Figure 3:
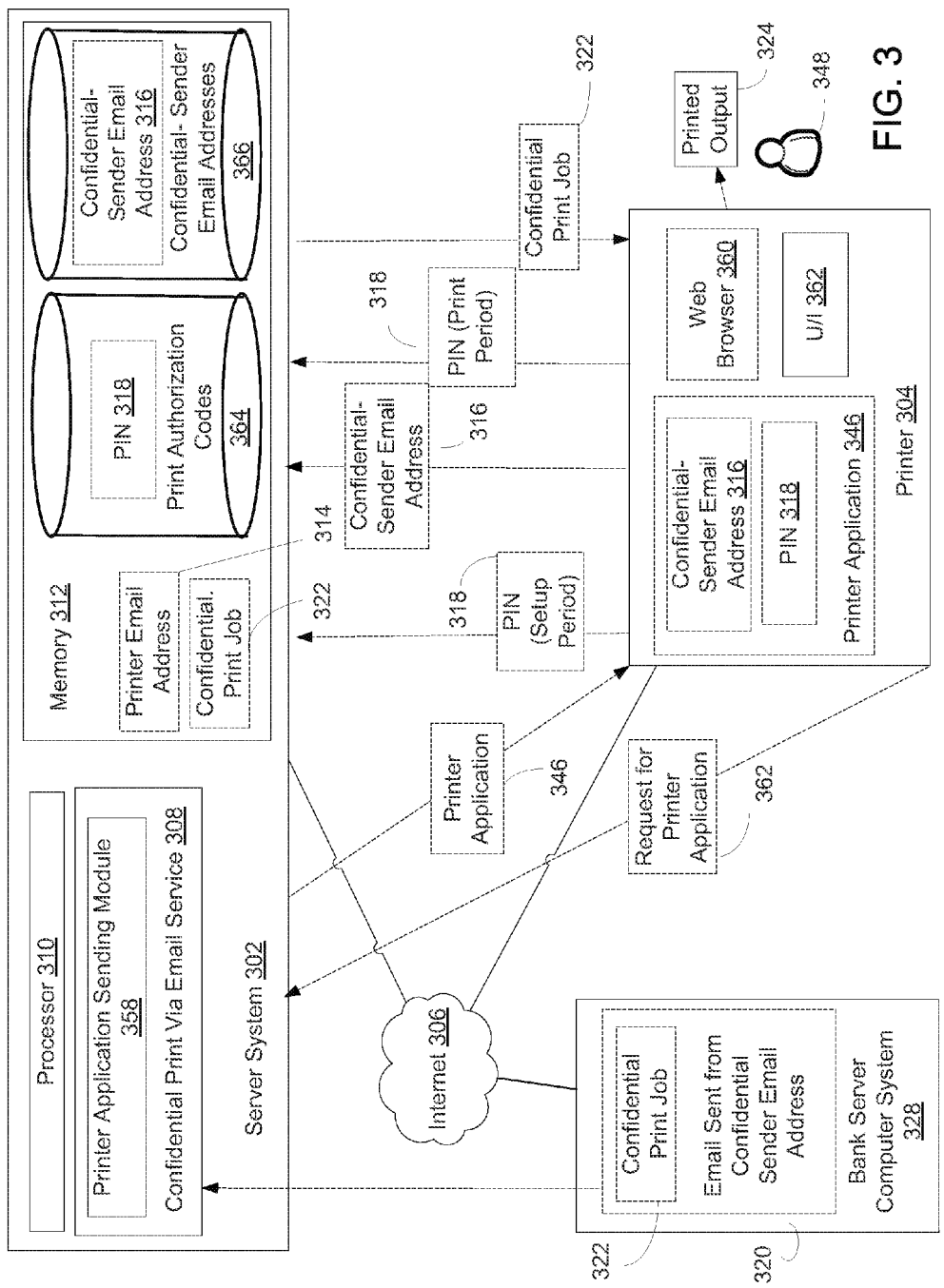
FIG. 3 is a block diagram illustrating a system according to various examples.

FIG. 3 is a block diagram illustrating a system according to various examples. FIG. 3 includes particular components, modules, etc. according to various examples. However, in different examples, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 3 shows a server system 302, a bank computer system 328, and a printer 304, each electronically connected to each other via an internet 306.

Server system 302 represents generally any computing device or group of computing devices configured to send and receive network requests, send and receive data, and/or otherwise communicate with bank server computer system 328 and printer 304. The sending and receiving of network requests and data, and communications includes, but is not limited to, network requests, data, and communications associated with receiving print jobs, including receiving print jobs via email, for printing at printer 304, and sending confidential print jobs to print jobs to printer 304. In an example, the server system 302 may be a server, desktop computer, notebook computer, tablet computer, smartphone, or any other computing device.

Bank server computer system 328 represents generally any computing device or group of computing devices configured to send and receive network requests, send and receive data, and/or otherwise communicate with the server system 302. The sending and receiving of network requests and data, and communications includes, but is not limited to, network requests, data, and communications associated with sending emails that includes print jobs to server system 302. In an example, the bank server computer system 328 may be a server, desktop computer, notebook computer, tablet computer, smartphone, or any other computing device.

Internet-connected printer 304 represents generally any computing device or group of computing devices operable to produce a printed print job or printed content, and additionally operable to send and receive internet requests, receive printable content and print jobs, and otherwise communicate, via the internet 306, with the server system 302. The sending and receiving of network requests and data, also includes network requests, data, and communications associated with setting up of printer 304 to communicate and interact, via the internet 306, with the confidential print-via-email service 308 executing at the server system 302, and with the sending of print authorization codes to trigger the printing of confidential print jobs stored at server system 302. In this example, the printer 304 is shown to include a web browser 360, and a touch-sensitive display screen or other user interface 362 to enable a user to communicate printer application download requests, print authorization codes, and print requests to server system 302, and to enable the printer 304 to receive print jobs from server system 302.

Internet 306 represents generally hardware components and computers interconnected by communications channels that allow sharing of resources and information. Internet 306 may include a cable, wireless, fiber optic, or remote connection via a telecommunication link, an infrared link, a radio frequency link, or some combination of these, or any other connectors or systems that provide electronic communication. Internet 306 may be or include, at least in part, an intranet, the Internet, or a combination of both. Internet 306 may also include intermediate proxies, routers, switches, load balancers, and the like. The paths followed by internet 306 between the server system 302, the bank server computer system 328, and the printer 304 as depicted in FIG. 3 represent the logical communication paths between these devices, not necessarily the physical paths between the devices.

Server system 302 is shown to include a confidential print-via-email service 308, a processor 310, and a memory 312. The confidential print-via-email service 308 (also referred to herein as "CPVES") 308 includes a printer application sending module 358. Processor 310 represents generally any instruction execution system, such as a computer/processor based system or an ASIC (Application Specific Integrated Circuit), a computer, or other system that can fetch or obtain instructions or logic stored in memory 312 and execute the instructions or logic contained therein. Memory 312 represents generally any memory configured to store program instructions and other data.

In the example of FIG. 3, the CPVES 308 causes the storage of a printer email address 314 that is unique to printer 304. In an example, the stored email address is in the form of an alphanumeric string such as "Biswalhomeprinter@hpeprint.com", and is an email address to which a user or system may send an email with a print job, to cause printing of the print job at printer 304.

In the example of FIG. 3, a user 348 interacts with the user interface 362 at printer 304 to cause the printer to send to the server system 302 a request 362 for a printer application. In this example, in response to the request 362 the printer application sending module 358 causes server system 302 to send a confidential print-via-email setup printer application 346 to the printer 304. In one example, the printer application 346 is a confidential print-via-email application executing at printer 304. In another example, the printer application 346 is software that allows a user at printer 304 to interact with a confidential print-via-email application executing at server system 302 or at another computer system separate from printer 304.

Continuing with the example of FIG. 3, a user 348 interacts with the installed printer application 346, during the printer setup period, to cause the sending of a confidential-sender email address 316 to the server system 302. The CVPES 308 receives the confidential-sender email address 316 via the printer application 346, and then stores the confidential-sender email address 316 in memory 312. The confidential-sender email address 316 is an email address from which the user 348 expects to receive confidential print jobs at printer 304. In this example, by submitting the confidential-sender email address 316 to the server system 302, the user has instructed the confidential print via email service 308 to recognize as confidential all print jobs that are attached to or otherwise included with emails sent from the confidential sender email address 316. In this example, the confidential sender email address 316 is an address for the user's bank, and the CPVES 308 will hold in memory 312 at server 302 print jobs received via emails sent from the bank confidential sender email address 316. The CPVES 308 holds such print jobs in memory 312 pending receipt of a valid print authorization code that authorizes release of such print jobs to the printer 304 for printing.

In this example, also during the set-up period, a user 348 interacts with the installed printer application 346, to cause the sending of a PIN 318 to the server system 302 for storage in memory 312 at the server system. In this example, the PIN 318 is stored in memory 312 within a database 364 that includes a set of print authorization codes received by the CPVES 304. The CPVES 308 receives the PIN from the printer 304 via the printer application 304, and stores the PIN at memory 312. In this example, the CPVES 308 receives the PIN 318 from the confidential print setup computing device 326 as a result of a user 348 having provided the PIN 318 at the device 326 and the device having sent the PIN 318, via the internet 306, to the CPVES 308 at server system 302. The confidential print setup module 336 stores the PIN 318 in memory 312 during the setup period so that it is available for comparison or verification purposes when the print authorization code is again received at CPVES 308 during a print request and printing period.

During a print request and printing period occurring after the confidential print setup module receives and stores the confidential-sender email address 316, the CPVES 308 receives an email 320 that includes a print job 322 and that was sent to the printer email address 314. In this example, the email 320 was sent from the confidential-sender email address 316 that had been identified during the setup period as a provider of confidential print jobs. In this example, the email 320 was sent as a result of user interaction with, or a system instruction at, the bank server computer system 328.

Also during the print request and printing period, the CPVES 308 makes a determination that the email 320 was sent from the confidential-sender address 316. In an example, the CPVES 308 compares the sender address of the email 320 to a database 366 of confidential-sender email addresses held in memory 312, and finds that the sender address of email 320 is the same as or matches the confidential sender email address 316 held in memory 312. Responsive to determining that the email 320 was sent from the confidential-sender address 316, CPVES 308 stores the print job 322 that is included in the email 322 in memory 312. In an example, the CPVES 308 causes the print job 322 to be stored until such time as a valid PIN 318 is received at the confidential print via email service.

Continuing with the example of FIG. 3, during the print request and printing period that follows the receipt of the confidential sender email address 316 at the server system 302, a user 348 at the printer 304 causes the printer 304 to send the PIN 318 to the server system 302. In this example, the printer 304 sends the PIN 318 to the server system 302 as a result of the user 348 having provided the PIN 318 at the printer 304 via the user interface 363 and the printer having sent the PIN 318, via the internet 306, to the CPVES 308 at server system 302.

The CPVES 308, during the print request and printing period, receives the PIN 318 from the printer 304 via the internet 306. Responsive to receiving the PIN 318, the CPVES 308 sends the stored confidential print job 322 to the printer 304 for printing. The printer 304 prints the confidential print job 322 upon a media to create the printed output 324. In this example as the user 348 sent the PIN 318 from the printer 304 to the server system 302, so the user 348 will be present at the printer 304 to collect the printed output 324.

The functions and operations described with respect to the CPVES 308 and the server system 302 may be implemented as a non-transitory computer-readable storage medium containing instructions executed by a processor (e.g., processor 310) and stored in a memory (e.g., memory 312). In a given implementation, processor 310 may represent multiple processors, and memory 312 may represent multiple memories. Processor 310 represents generally any instruction execution system, such as a computer/processor based system or an ASIC (Application Specific Integrated Circuit), a computer, or other system that can fetch or obtain instructions or logic stored in memory 312 and execute the instructions or logic contained therein. Memory 312 represents generally any memory configured to store program instructions and other data.

Figure 4:
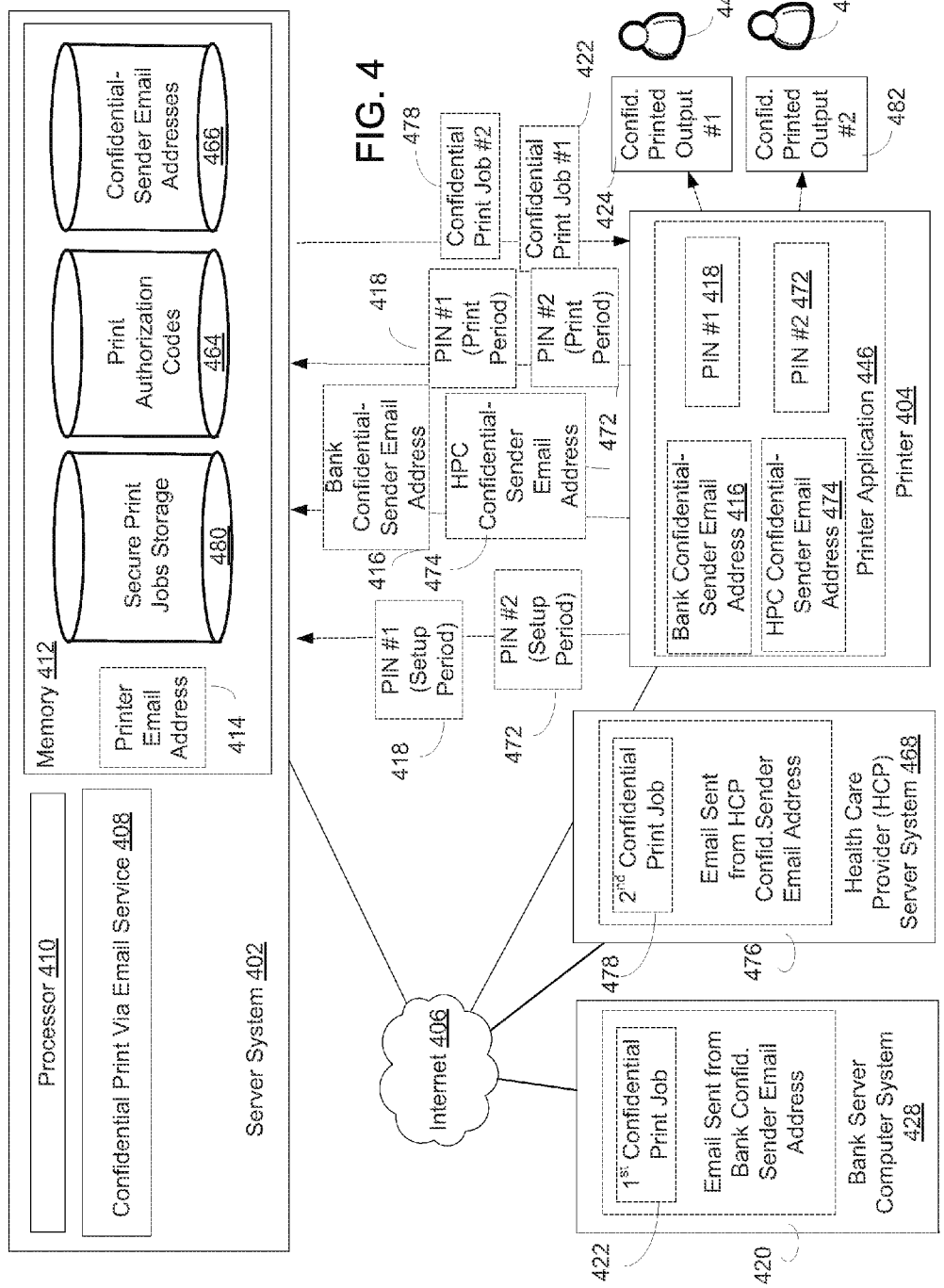
FIG. 4 is a block diagram illustrating a system according to various examples.

FIG. 4 is a block diagram illustrating a system according to various examples. FIG. 4 includes particular components, modules, etc. according to various examples. However, in different examples, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 4 shows a server system 302, a bank computer system 328, a health care provider ("HCP") server system 402, and a printer 404, each electronically connected to each other via an internet 406.

Server system 402 is shown to include a confidential print-via-email service 408, a processor 410, and a memory 412. The confidential print-via-email service 408 (also referred to herein as "CPVES") 408 includes a printer application sending module 458. Processor 410 represents generally any instruction execution system, such as a computer/processor based system or an ASIC (Application Specific Integrated Circuit), a computer, or other system that can fetch or obtain instructions or logic stored in memory 412 and execute the instructions or logic contained therein. Memory 412 represents generally any memory configured to store program instructions and other data.

In the example of FIG. 4, the CPVES 408 causes the storage of a printer email address 414 that is unique to printer 404. In an example, the stored email address is in the form of an alphanumeric string such as "printer 12345@hpeprint.com", and is an email address to which a user or system may send an email with a print job, to cause printing of the print job at printer 404.

During a set-up period, a first user 448 interacts with a printer application at printer 404, via the first user's email account or another account associated with the first user, to cause the sending of a first PIN 418 to the server system 402 for storage in memory 412 at the server system. In an example, in the same set up period or in a different setup period, a second user 470 interacts with the printer application, via the second user's email account or another account associated with the second user, to cause the sending of a second PIN 472 to the server system 402 for storage in memory 412 at the server system. In this example, the first PIN 418 and second PIN 472 are stored in memory 412 within a print authorization codes database 464 that includes a set of print authorization codes received by the CPVES 408 from various users. The CPVES 408 receives the PINs from the printer 404 via the printer application 404.

Continuing with the example of FIG. 4, during a setup period the first user 448 interacts with a printer application 446 at printer 404, via the first user's email account, to cause the sending of a first confidential-sender email address 416 to the server system 402. In this example, the first confidential-sender email address is the email address for a bank associated with the bank server computer system 428.

In an example, during the same setup period or a different setup period, the second user 470 interacts with the printer application 446, via the second user's email account, to cause the sending of a second confidential-sender email address 474 to the server system 402. In this example, the second confidential sender email address 474 is the email address for a health care provider associated with the HCP server computer system 468.

The CVPES 408 receives the first and second confidential-sender email addresses 416 474 via the printer application 446, and then stores the first confidential-sender email address 416 in memory 412 within a confidential-sender email addresses database 466 that includes a set of confidential-sender email addresses received by the CPVES 404 from various users via various user email accounts, or via various other user accounts.

During a print request and printing period occurring after the confidential print setup module receives and stores the first and second confidential-sender email addresses 416 474, the CPVES 408 receives a first email 420 that includes a first print job 422 and that was sent to the printer email address 414. In this example, the first email 420 was sent from the first confidential-sender email address 416 that had been identified during the setup period as a provider of confidential print jobs. In this example, the first email 420 was sent as a result of user interaction with, or a system instruction at, the bank server system 428.

During the print request and printing period, the CPVES 408 receives a second email 476 that includes a second print job 478 and that was sent to the printer email address 414. In this example, the second email 476 was sent from the second confidential-sender email address 416 that had been identified during the setup period as a provider of confidential print jobs. In this example, the second email 476 was sent as a result of user interaction with, or a system instruction at, the HCP server system 468.

Continuing with the example of FIG. 4, during the print request and printing period, the CPVES 408 makes a determination that the first email 420 and the second email 476 were sent from the first and second confidential-sender address 416 474. In an example, the CPVES 408 compares the sender address of the first and second emails 420 476 to the database 466 of confidential-sender email addresses held in memory 412, and finds that the sender addresses of first email 420 are the same as or match the confidential sender email addresses 416 held in memory 412.

Responsive to determining that the first email 420 and the second email 476 were sent from the confidential-sender addresses 416 474, CPVES 408 stores the first print job 422 that is included in the first email 422, and the second print job 478 that is included in the second email 476, in memory 412 within a secure print jobs storage component 480. In an example, the CPVES 408 causes the first and second print jobs 422 478 to be stored until such time as valid PINs are received at the CPVES 408.

Continuing with the example of FIG. 4, during the print request and printing period that follows the receipt of the confidential sender email addresses 416 at the server system 402, the first user 448 at the printer 404 causes the printer 404 to send the first PIN 418 to the server system 402. In this example, the printer 404 sends the first PIN 418 to the server system 402 as a result of the first user 448 having provided the first PIN 418 at the printer 404 via the user interface 463 and the printer having sent the first PIN 418, via the internet 406, to the CPVES 408 at server system 402. The CPVES 408 receives the first PIN 418 from the printer 404 via the internet 406. Responsive to receiving the first PIN 418, the CPVES 408 sends the stored confidential first print job 422 to the printer 404 for printing. The printer 404 prints the confidential first print job 422 upon a media to create the first printed output 424. In this example as the first user 448 sent the first PIN 418 from the printer 404 to the server system 402, the first user 448 will be present at the printer 404 to pick up the first printed output 424 when printed.

Continuing with the example of FIG. 4, in a separate transaction, at the same time as the first user's printing transaction or at different time, the second user 470 at the printer 404 causes the printer 404 to send the second PIN 472 to the server system 402. The CPVES 408 receives the second PIN 472 from the printer 404 via the internet 406. Responsive to receiving the second PIN 472, the CPVES 408 sends the stored confidential second print job 478 to the printer 404 for printing. The printer 404 prints the confidential second print job 478 upon a media to create the second printed output 482. In this example as the second user 470 sent the second PIN 472 from the printer 404 to the server system 402, the second user 470 will be present at the printer 404 to pick up the second printed output 482 when printed.

The functions and operations described with respect to the CPVES 408 and the server system 402 may be implemented as a non-transitory computer-readable storage medium containing instructions executed by a processor (e.g., processor 410) and stored in a memory (e.g., memory 412). In a given implementation, processor 410 may represent multiple processors, and memory 412 may represent multiple memories. Processor 410 represents generally any instruction execution system, such as a computer/processor based system or an ASIC (Application Specific Integrated Circuit), a computer, or other system that can fetch or obtain instructions or logic stored in memory 412 and execute the instructions or logic contained therein. Memory 412 represents generally any memory configured to store program instructions and other data.

Figure 5:
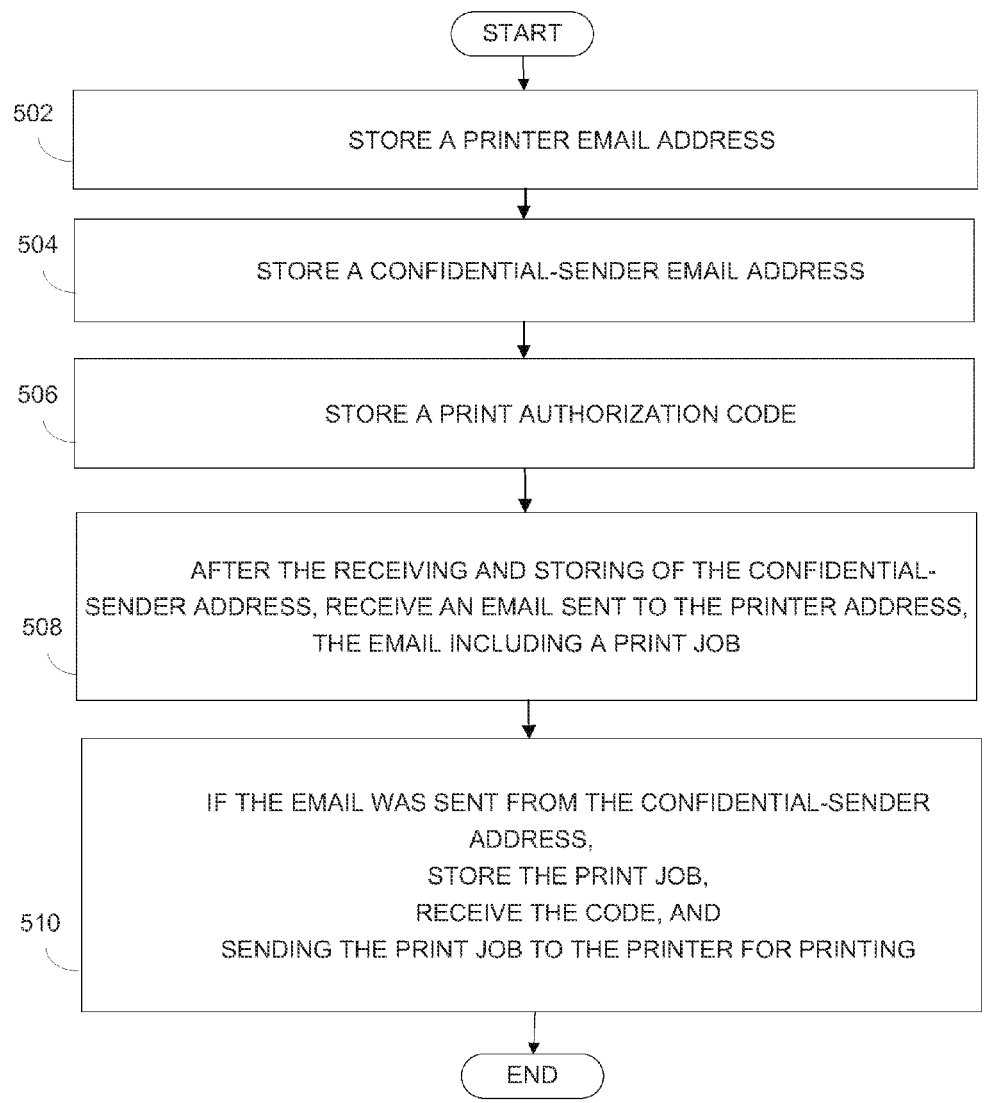
FIGS. 5 and 6 are flow diagrams depicting steps taken to implement various examples.
Figure 6:
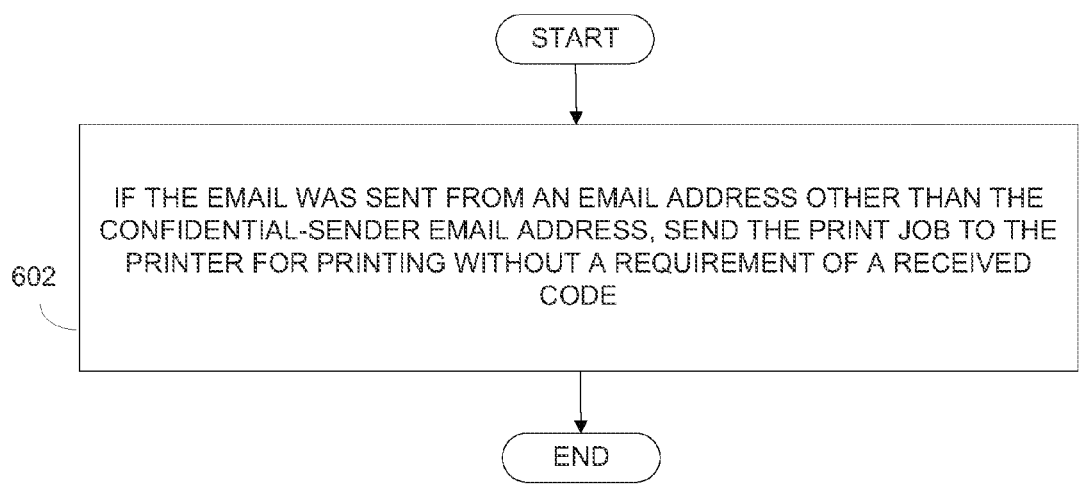

FIGS. 5 and 6 are flow diagrams of operation in a system according to various examples. In discussing FIG. 5, reference may be made to the diagrams of FIG. 2 to provide contextual examples. Implementation, however, is not limited to those examples. Starting with FIG. 5, a printer email address is stored (block 502). Referring back to FIG. 2, printer address module 234 may be responsible for implementing block 502.

Continuing with FIG. 5, a confidential-sender email address is stored (block 504). Referring back to FIG. 2, confidential print setup module 236 may be responsible for implementing block 504.

Continuing with FIG. 5, a print authorization code is stored (block 506). Referring back to FIG. 2, confidential print setup module 236 may be responsible for implementing block 506.

Continuing with FIG. 5, after the receiving and storing of the confidential-sender address, an email is received. The email is an email that was sent to the printer address, and includes a print job (block 508). Referring back to FIG. 2, inbox module 238 may be responsible for implementing block 508

Continuing with FIG. 5, if the email was sent from the confidential-sender address, the print job is stored. The authorization code is received. The print job is sent to the printer for printing following receipt of the authorization code (block 510). Referring back to FIG. 2, the confidential job release module 242 may be responsible for implementing block 510.

Moving to FIG. 6, if the email was sent from an email address other than the confidential-sender email address, the print job is sent to the printer for printing without a requirement of a received code (block 602). Referring back to FIG. 2, non-confidential job release module 244 may be responsible for implementing block 602.

Various modifications may be made to the disclosed examples and implementations without departing from their scope. Therefore, the illustrations and examples herein should be construed in an illustrative, and not a restrictive, sense.

What is claimed is:

1. A non-transitory computer-readable storage medium comprising instructions that, when executed by a computing device connected to a network-connected printer via a network comprising an intranet or internet, cause the computing device to:
store an email address of the network-connected printer;
store a print authorization code;
receive a confidential-sender email address and store the confidential-sender email address in a list of confidential-sender email addresses;
receive, from a sender address, an email sent to the email address of the network-connected printer, the email including a print job;
determine whether the sender address matches a stored confidential-sender email address in the list;
in response to a determination by the computing device that the sender address matches a confidential-sender email address in the list, cause the computing device to store the print job and cause the computing device to require receipt of a print authorization code to send the print job to the network-connected printer, and responsive to receiving a print authorization code that matches the stored print authorization code, cause the computing device to send the print job to the network-connected printer via the network; and
in response to a determination by the computing device that the sender address does not match a confidential-sender email address in the list, cause the system computing device to send the print job to the network-connected printer via the network without requiring receipt of a print authorization code.

2. The non-transitory computer-readable storage medium of claim 1, wherein the confidential-sender email address is received via a web application, and wherein the web application is accessed by a user at a network connected computing device other than the network-connected printer.

3. The non-transitory computer-readable storage medium of claim 2, wherein the web application is a web application operable to set up a printing-via-email feature for the network-connected printer.

4. The non-transitory computer-readable storage medium of claim 1, wherein the confidential-sender email address is received via a printer application accessed by a user at the network-connected printer.

5. The non-transitory computer-readable storage medium of claim 1, wherein the instructions are to cause the computing device to generate the print authorization code and send the print authorization code to another computing device connected to the network.

6. The non-transitory computer-readable storage medium of claim 1, wherein prior to the receiving of the email, the instructions are to cause the computing device to receive the print authorization code from another computing device connected to the network.

7. The non-transitory computer-readable storage medium of claim 1, wherein prior to the receiving of the email, the instructions cause the system to receive the print authorization code from another computing device connected to the network.

8. The non-transitory computer-readable storage medium of claim 1, wherein prior to the receiving of the email, the instructions are to cause the computing device to receive the print authorization code from the network-connected printer.

9. The non-transitory computer-readable storage medium of claim 1, wherein prior to the receiving of the email, the instructions are cause the computing device to receive the print authorization code from the network-connected printer provided by a user.

10. The non-transitory computer-readable storage medium of claim 1, wherein the instructions to cause computing device to receive the print authorization code further comprises instructions to cause the computing device to receive the print authorization code from another connected computing device connected to the network.

11. The non-transitory computer-readable storage medium of claim 1, wherein the instructions to cause the computing device to receive the print authorization code further comprises instructions to cause the computing device to receive the print authorization code from the network-connected printer.

12. A system, comprising a memory and a processor to execute instructions stored in the memory to cause the processor to:
- store an email address of a network-connected printer;
- receive a confidential-sender email address, and store the confidential-sender email address in a list of confidential-sender email addresses;
- store a print authorization code;
- receive, from a sender address, an email sent to the printer email address of the network-connected printer, the email including a print job;
- determine whether the sender address matches a confidential-sender email address in the list;
- in response to a determination that the sender address matches a confidential-sender email address stored in the list, store the print job and cause the processor to require receipt of a print authorization code to send the print job to the network-connected printer, and responsive to receiving a print authorization code that matches the stored print authorization code, send the print job to the network-connected printer via the network; and
- in response to a determination that the sender address does not match a confidential-sender email address in the list, send the print job to the network-connected printer via the network without requiring receipt of a print authorization code.

13. The system of claim 12, wherein the instructions are to cause the processor to send to the network-connected printer, or to another network connected computing device, a notice that the print job is available for printing at the network-connected printer following a user input of the print authorization code.

14. The system of claim 12, wherein the processor is to receive the print authorization code in response to at least one of an entered password, a code-bearing media, and biometric data.

15. A computer-implemented method, comprising:
- storing an email address of a network-connected printer;
- receiving a confidential-sender email address and storing the confidential email address in a list of confidential-sender email addresses;
- storing a print authorization code;
- receiving, from a sender address, an email sent to the email address of the network-connected printer, the email including a print job;
- determining, by a computing device, whether the sender address matches a stored confidential-sender email address in the list;
- in response to determining that the sender address matches a confidential-sender email address in the list, storing the print job and causing the computing device to require receipt of a print authorization code to send the print job to the network-connected printer, and responsive to receiving a print authorization code that matches the stored print authorization code, sending the print job to the network-connected printer via the network; and
- in response to determining that the sender address does not match a confidential-sender email address stored in the list, sending the print job to the network-connected printer via the network without requiring receipt of a print authorization code.

16. The method of claim 15, further comprising:
- sending a printer application to the network-connected printer; and
- prior to the receiving of the email, receiving the print authorization code from the network-connected printer via the printer application.

17. The method of claim 15, further comprising:
- sending a printer application to the network-connected printer; and
- wherein storing the print authorization code further comprises receiving the print authorization code from the network-connected printer via the printer application.

18. The method of claim 15,
- wherein the confidential-sender email address is a first confidential-sender email address, the print authorization code is a first print authorization code associated with a first user, and the email is a first email; and
- wherein the method further comprises:
  - storing a second print authorization code associated with a second user;
  - receiving a second confidential-sender email address;
  - storing the second confidential-sender email address in the list;
  - receiving a second email sent to the printer address, the second email including a second print job;
  - determining whether the second email was sent from the second confidential-sender address in the list;
  - in response to determining that the second email was sent from the second confidential-sender address in the list, storing the second print job and causing the computing device to require receipt of a print authorization code to send the second print job to the network-connected printer; and
  - responsive to receiving a print authorization code that matches the second print authorization code, sending the second print job to the network-connected printer.

* * * * *